United States Patent
Pierret et al.

(10) Patent No.: US 8,129,929 B2
(45) Date of Patent: Mar. 6, 2012

(54) CONTROL AND POWER DEVICE FOR A ROTATING ELECTRICAL MACHINE

(75) Inventors: Jean-Marie Pierret, Paris (FR); Francis Pichon, Eragny sur Oise (FR)

(73) Assignee: Valeo Equipements Electriques Moteur, Creteil (FR)

( * ) Notice: Subject to any disclaimer, the term of this patent is extended or adjusted under 35 U.S.C. 154(b) by 788 days.

(21) Appl. No.: 11/571,778

(22) PCT Filed: Jul. 18, 2005

(86) PCT No.: PCT/FR2005/001829
§ 371 (c)(1),
(2), (4) Date: Sep. 9, 2008

(87) PCT Pub. No.: WO2006/024730
PCT Pub. Date: Mar. 9, 2006

(65) Prior Publication Data
US 2008/0315823 A1    Dec. 25, 2008

(30) Foreign Application Priority Data
Jul. 29, 2004    (FR) ...................................... 04 08418

(51) Int. Cl.
*H02P 7/00*    (2006.01)
(52) U.S. Cl. ........................................ 318/140; 318/727
(58) Field of Classification Search .................. 318/140, 318/727, 801, 805
See application file for complete search history.

(56) References Cited

U.S. PATENT DOCUMENTS

| | | | | |
|---|---|---|---|---|
| 4,484,127 A * | 11/1984 | Salihi et al. | .................. | 318/802 |
| 4,926,068 A * | 5/1990 | Fujita | .............. | 327/72 |
| 4,948,997 A * | 8/1990 | Ohmitsu et al. | ............. | 310/113 |
| 5,020,491 A * | 6/1991 | Mashino | .................. | 123/192.1 |
| 5,223,775 A * | 6/1993 | Mongeau | ..................... | 318/432 |
| 5,448,154 A * | 9/1995 | Kanke et al. | .................. | 322/28 |
| 5,543,703 A | 8/1996 | Kusase et al. | | |
| 5,581,171 A * | 12/1996 | Kerfoot et al. | ................ | 320/137 |
| 5,650,708 A * | 7/1997 | Sawada et al. | ................ | 318/801 |
| 5,742,498 A | 4/1998 | Taniguchi et al. | | |
| 6,195,276 B1 | 2/2001 | Sebille | | |
| 6,310,468 B1 * | 10/2001 | Feldtkeller | .................. | 323/282 |
| 6,404,156 B1 * | 6/2002 | Okanoue et al. | ............. | 318/432 |
| 2005/0253457 A1 * | 11/2005 | Pierret et al. | ................ | 307/10.1 |

FOREIGN PATENT DOCUMENTS

| | | |
|---|---|---|
| EP | 0660501 | 6/1995 |
| EP | 0751601 | 1/1997 |
| EP | 0911958 | 4/1999 |
| FR | 2842041 | 1/2004 |

* cited by examiner

*Primary Examiner* — Rina Duda
(74) *Attorney, Agent, or Firm* — Jacox, Meckstroth & Jenkins

(57) ABSTRACT

A control and power device for a rotating electrical machine comprising a management circuit and a power circuit including a number of power transistors and driver circuits associated with the power transistors. The device provides connection between the management circuit and the driver circuits for switching on the driver circuits and transmitting at least one transit potential between the management circuit and the driver circuits. The invention is applicable to alternator-starter.

25 Claims, 5 Drawing Sheets

CONTROL AND POWER DEVICE FOR A ROTATING ELECTRICAL MACHINE

BACKGROUND OF THE INVENTION

1. Field of the Invention

This invention relates to a control and power device for a rotary electrical machine, comprising a control circuit and a power circuit, the power circuit including a plurality of power transistors and control circuits associated with the transistors. The invention finds applications in the field of the automotive industry, and in particular in the field of alternators and alternator starters.

2. Description of the Related Art

In a motor vehicle having a heat engine and an alternator, both included in one casing, the alternator comprising the following:

a rotor, which represents an inductor or inductance, which is conventionally associated with two slip rings, and two brushes by which an excitation current is applied; and a multi-phase stator carrying a plurality of coils or windings, representing an armature, which are either star connected or delta connected in the most frequent case of a three-phase structure, and which deliver electric power to a rectifier bridge when the machine is working as an alternator The stator surrounds the rotor, the brushes of which are connected to a regulator of the alternator in order to maintain the voltage of the alternator at a desired voltage between 12 and 14V for a battery, according to whether the latter is flat or charged, respectively.

The alternator enables rotational motion of the inductive rotor, driven by the heat engine of the vehicle, to be converted into an armature electric current which is induced in the windings of the stator.

The alternator is also able to be reversible and to constitute an electric motor, enabling the heat engine of the vehicle to be driven in rotation via the rotor shaft. This reversible alternator is also called an alternator starter or a starter alternator. It converts mechanical energy into electrical energy and vice versa.

Accordingly, in the alternator mode, the alternator starter, in particular, charges up the battery of the vehicle, while in its starter mode the alternator starter drives the heat engine, also referred to as an internal combustion engine, of the motor vehicle in order to start it.

A power unit is provided which is connected to the phases of the stator and which is connected between earth and a power supply terminal of a battery. The power unit serves as a control bridge or wave generator of the phases when the alternator starter is working in starter mode and serves as a rectifier bridge when it is working in alternator mode. For example, it comprises diodes which are associated with transistors of the MOSFET type, which are well known to the person skilled in this field, and is controlled by a control unit.

At the present time it is conventional to provide a power unit in which the power transistors constitute a bridge of interrupters, and are controlled in synchronism with the current which is present in one winding of the stator, and this is called synchronous rectification.

It is thus necessary to control the transistors by means of a relatively sophisticated control unit, such as for example a micro-controller, current sensors for detecting the direction of the current in the windings of the armature of the alternator, etc.

In a first known embodiment, the power unit, comprising the rectifier bridge and the control unit, constitutes an electronic control and power module which is most commonly fitted on the outside of the alternator starter with which it is connected through electrical wires that are connected to the output terminals of the phases of the stator.

In a second embodiment, which is described in European patent EP-A1-0911958, it is arranged that the electronic control and power module is placed directly in the casing of the alternator starter, which avoids the above mentioned electrical wires and thereby avoids problems of fitting on the vehicle. For this purpose, the control and power module is miniaturized.

However, because of the increasingly severe restrictions of miniaturization, and manufacturing constraints, in particular as regards the dimensions of the casing that have to be followed, the size of the electronic control and power module is a problem due to the numerous components which are necessary in the module, and due also to the interconnections by which these various components are connected together.

SUMMARY OF THE INVENTION

Accordingly, a technical problem to be resolved by the subject of the present invention is to propose a control and power device for a rotary electrical machine, comprising a management circuit and a power circuit, the power circuit including a plurality of power transistors, and control circuits associated with the power transistors, together with an associated control and powering method which enables the size of the device within the casing of the alternator starter to be reduced, while at the same time providing it with the required control and power functions.

The solution to the technical problem which is presented consists, according to a first aspect of the present invention, in that the control and power device includes connecting means between the management circuit and the control circuits being adapted to apply a voltage to the control circuits and to transmit at least one potential passing between the controlling circuit and the control circuits.

Thus, as will be seen in detail later herein, the present invention has the advantage that it reduces the number of connections in the control and power device, due to the use of a single connecting means which performs two different functions and which thereby reduces the physical size of the device and facilitates its incorporation within the casing of an alternator starter.

In a preferred, but non-limiting embodiment, the at least one potential is a power supply voltage for supplying the power transistors.

In one preferred, but non-limiting embodiment, a control circuit includes means adapted to initiate the application of the voltage.

In a preferred, but non-limiting embodiment, the means for initiating the application of voltage are adapted to effect initiation as a function of the potential. Thus, the control circuits are activated by the potential which serves to supply power to the grids of the transistors. More precisely, this potential enables the power supplies for the control circuits to be activated.

In one preferred, but non-limiting embodiment, the means for initiating the application of voltage include a comparator designed to compare the at least one potential with respect to a first reference voltage.

In one preferred, but non-limiting embodiment, the comparator includes hysteresis for determining the first reference voltage. This hysteresis has the advantage that it stabilizes the comparison which is carried out.

In one preferred, but non-limiting embodiment, the comparator is adapted to transmit an unblocking signal according to the result of the comparison with the first reference voltage, in such a way as to prime the control circuit.

In one preferred, but non-limiting embodiment, the means for initiating the application of voltage further include a current source which is adapted to receive the unblocking signal and to transmit an activation signal to the control circuit whereby to prime it.

In one preferred, but non-limiting embodiment, a control circuit further includes means for detecting breakage of the connecting means. This has the advantage of detecting whether the connecting means are defective.

In a preferred, but non-limiting embodiment, the detecting means are adapted to transmit a signal as to breakage of the connection to the management circuit. This has the advantage of permitting the management circuit to apply a predetermined strategy following the rupture.

According to a second aspect of the present invention, the solution to the technical problems that was presented consists in that the method of control and powering includes the steps of:

applying a voltage to the power circuits, and transmitting at least one potential passing between the control circuit and the control circuits of a unique connecting means between the management circuit and the control circuits.

Other objects and advantages of the invention will be apparent from the following description, the accompanying drawings and the appended claims.

DETAILED DESCRIPTION OF EMBODIMENTS OF THE INVENTION

Figure 1:
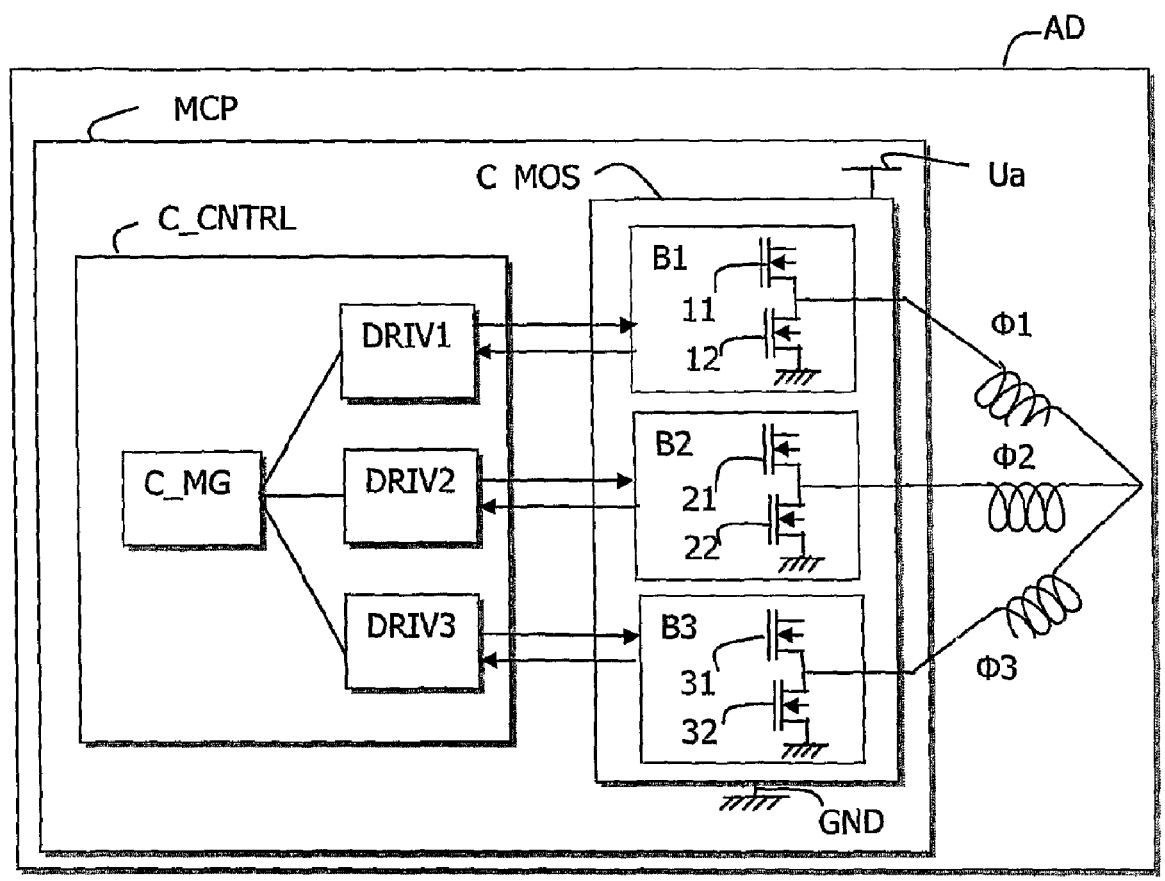
FIG. 1 is a diagrammatic representation of a control and power device according to the invention.

FIG. 1 shows a module, or control and power device MCP according to the invention for a starter alternator AD of a vehicle.

The control and power module MCP comprises:

a power circuit or unit C_MOS which includes a rectifier bridge, the bridge having three identical branches B1, B2 and B3, a control unit C_CNTRL which includes control circuits DRIV1, DRIV2 and DRIV3, also referred to as drivers, and a management circuit C_MG.

The alternator starter AD is, in the example given, a three-phase machine which has three phases $\phi1$, $\phi2$ and $\phi3$, each of which is connected to one of the respective branches B1, B2 and B3 of the power unit C_MOS. Because the three branches B1, B2 and B3 are identical to each other, only the first branch B1 will be described in the rest of this description.

The first branch B1 of the rectifier bridge has two interrupters 11 and 12 which are power transistors. The first transistor 11 is called the high side transistor. It is connected between the first phase $\phi1$ of the alternator starter and a power supply Ua for the on-board wiring network of the vehicle. The second transistor 12 is called the low side transistor. It is connected between the first phase $\phi1$ of the alternator starter and an earth line GND.

The first driver DRIV1 of the control unit C_CNTRL is connected at its output to the grids of the two transistors 11 and 12. In this way, it enables the transistors 11 and 12 of the first branch B1 to be controlled. To this end, it compares the potentials of the first phase $\phi1$ of the alternator starter with the earth potential GNT of the rectifier bridge for the control of the transistor 12, and with the output potential Ua of the rectifier bridge for the control of the transistor 11.

In addition, the first driver DRIV1 is also connected at its input to the management circuit C_MG.

Each driver DRIV1, DRIV 2 and DRIV3 is controlled by the same management circuit C_MG.

Figure 2:
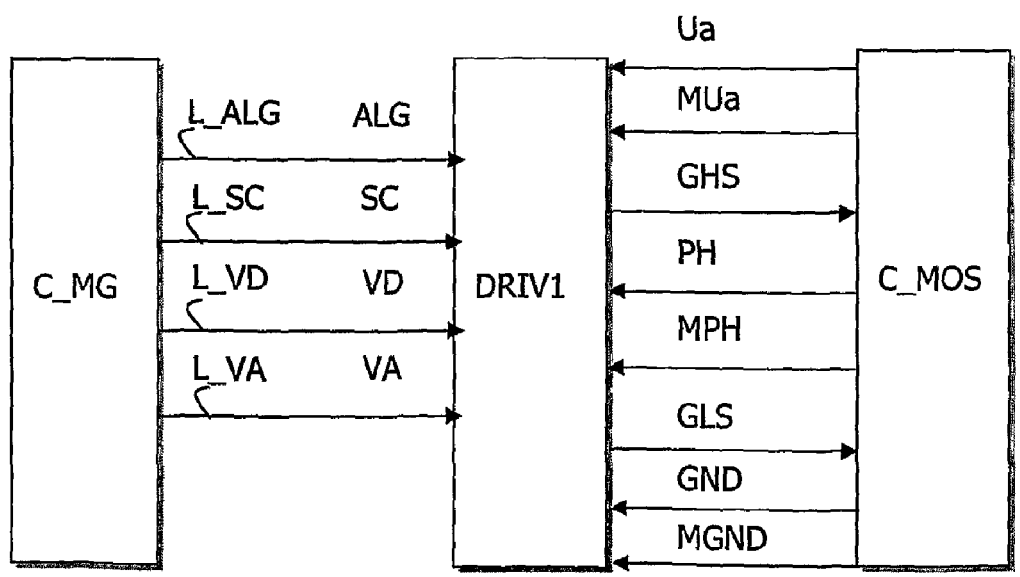
FIG. 2 shows the signals which are transmitted between a management circuit, a power circuit and control circuits of the control and power device shown in FIG. 1.

To this end, each driver DRIV receives at its input different signals from the management circuit C_MG. These signals are represented in FIG. 2 and are as follows.

A power supply ALG of the boost type, which is a power voltage enabling the grids of the transistors 11 and 12 to be supplied, Sensor signals SC which consist of signals supplied by sensors that detect the position of the rotor of the alternator starter, for indicating the position of the rotor of the alternator starter when the latter is in its starter mode, A validation signal VD for the starter mode, and A validation signal VA for the alternator mode.

These two last mentioned signals enable a driver DRIV to know whether the alternator starter is to work, at a precise instant, as an alternator or as a starter.

It will be noted that, in order to supply these signals, the control and power device MCP includes a number of corresponding connecting wires which are denoted inputs or connections L_ALG, L_SC, L_VD, L_VA, which are connected between the management circuit C_MG and a driver DRIV.

In addition, each driver DRIV receives first signals from the power unit C_MOS and transmits second signals to the power unit C_MOS, and especially to the transistors 11 and 12 of the rectifier bridge in the case of the first driver DRIV1. These received and transmitted signals are shown in FIG. 2 and are as follows.

The first received signals consist of:

a power supply potential Ua of the alternator starter, namely the supply potential for the on-board wiring network, equivalent to the battery voltage of the vehicle, which corresponds generally to a voltage of about 14V when charged, and about 13.5V when flat, a measurement signal MUa of the potential of the line Ua, a phase input PH coming from the alternator starter, a measurement signal MPH for the potential of the phase input PH, an earth potential GND, and a measurement signal MGND for the earth potential.

It will be noted that the measurement signals MUa, MPH and MGND are measurements taken directly at the terminals of a transistor or of one phase of the alternator.

The second transmitted signals consist of the following:

a control signal GHS for the grid of the first power transistor 11, and a control signal GS for the grid of the power transistor 12.

Figure 3:
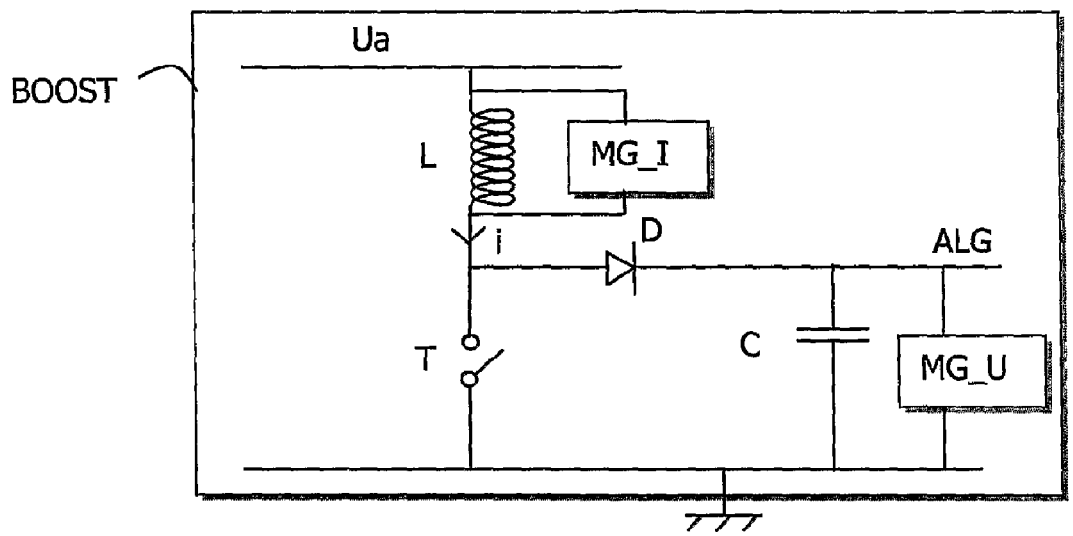
FIG. 3 shows one embodiment of a power supply system which is applicable to the control and power device of FIG. 1.

It will be noted that the power supply voltage ALG is supplied by a power supply system BOOST. One example of the power supply system BOOST, for supplying a power supply ALG, is shown in FIG. 3.

The system BOOST comprises the following:

an inductance L of value 100 µH, a diode D having a junction voltage Vd of about 0.6V, a capacitor C with a value of between 2 and 10 µF, and a transistor T of the MOS type, having a low starting voltage Vdson of about 0.2V In addition, this power supply system BOOST has a first potential Ua which corresponds to the battery voltage. This voltage is applied to the input of the inductance L.

Figure 4:
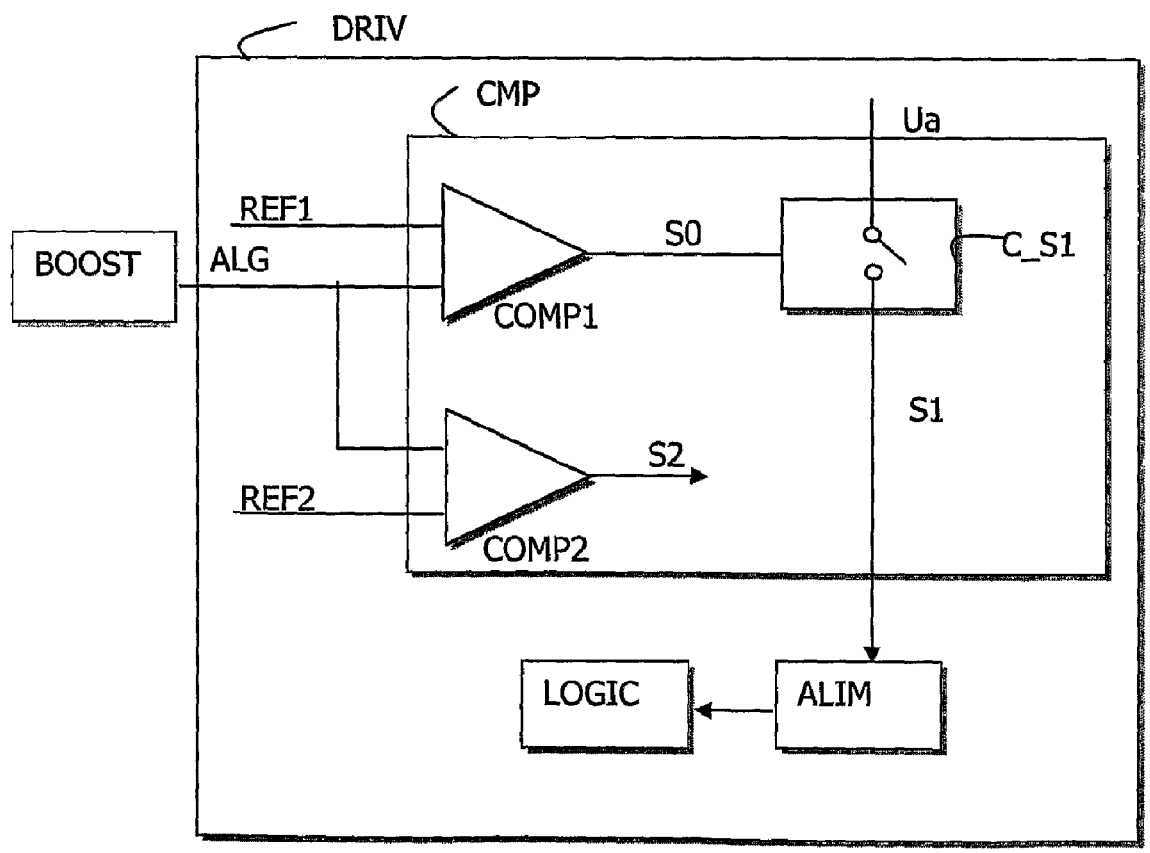
FIG. 4 is a diagrammatic representation of one embodiment of a means for initiating energization and means for detecting breakage of a connection, which are included in the control and power device of FIG. 1.

In FIG. 4, each driver DRIV includes means CMP for initiating energization, the means comprising a comparator COMP1 and a current source C_S1. These means are described in greater detail later herein. It will be noted that the other components and functions of a driver DRIV are known to a person skilled in this technical field and will therefore not be described in the remainder of this description.

The operation of the control and power device MCP of the alternator starter AD is achieved in the following way:

In the rest mode: when the vehicle is stationary and the ignition key is open (that is to say it has not been turned in the lock of the switch that energizes the on-board network of the vehicle), the management circuit C_MG is inactive and is unable to deliver a sufficiently high power supply voltage ALG to the corresponding input L_ALG of the driver DRIV1 to cause the associated transistors 11 and 12 of the power unit C_MOS to function. In consequence, the grid-source potentials of the transistors 11 and 12 are at zero. The transistors are both open. The inputs L_VD and L_VA are both at level zero.

In the stationary mode but with ignition key closed: when the vehicle is stationary and the ignition key is turned in the lock of the ignition switch, this causes the management circuit C_MG to be activated. The management circuit is then active.

Thus, in a first step (1), the management circuit C_MG activates the power supply system BOOST, which delivers a voltage or power supply potential ALG to the power input L_ALG of the driver DRIV1. This voltage is incremental.

The power supply system BOOST operates in the following way:

When the vehicle is in its rest mode, the transistor T is open, as shown in FIG. 3. Nothing is consumed. The battery voltage Ua is applied to the input of the inductance L. A current i flows in the inductance L and capacitor C charges up progressively. When the latter has become fully charged, the power supply voltage ALG is Ua−Vd−VL, where VL, the voltage across the terminals of the inductance, is 0. Thus there is no further current i flowing in the inductance L. It will be noted that the function of the diode D, known to a person skilled in this field, is to prevent the capacitor from discharging.

When the vehicle is working, with the ignition key turned or in its starting position, the management circuit C_MG transmits a control signal (not shown) to the transistor T, which closes.

Opening and closing of the transistor T are regulated by a cyclic ratio Rc which is dependent on the value of the current in the inductance L, the value of the power supply voltage ALG, and the value of the inductance L. In accordance with this cyclic ratio, there is a charging phase of charging current in the inductance L and a phase of discharge into the inductance L.

Thus, so long as the power supply voltage ALG is below an optimal working value of the driver DRIV, which is for example preferably Ua+15V, the transistor T oscillates, i.e. it opens and closes at a period Tc of the cyclic ratio Rc which depends on the value of the inductance L. Since the notion of a cyclic ratio is known to the person skilled in this technical field, it will not be described here. Thus, the capacitor C charges up each time the transistor T opens, i.e. at each phase of discharge of the current i into the inductance L. The power supply voltage ALG thus increases progressively over the course of time up to the optimum value Ua+15V.

In the embodiment shown in FIG. 3, the capacitor C enables the power supply voltage ALG to be dependent in a linear relationship on the battery voltage Ua. Thus, the capacitor C being connected to earth, this enables the following to be achieved:

problems of electromagnetic disturbances that one would meet with in the case of a second embodiment in which the capacitor C was connected to the potential Ua are avoided, and the problem is avoided of the power supply voltage ALG following the fluctuations in the battery voltage Ua, i.e. when the battery voltage increases in a fluctuating manner, the power supply voltage ALG also increases but without any fluctuations It will be noted that the second embodiment does however enable the power supply voltage to be synchronized more rapidly with respect to Ua, the capacitor C being connected directly to the potential Ua.

In one non-limiting embodiment, the power supply system BOOST further includes the following:

a current control loop MG_I, and a voltage control loop MG_U.

The current control loop MG_I enables the current I to be controlled if the current I in the inductance L does not exceed a maximum value Imax for example equal to 1 A. In the opposite case the transistor T is opened in such a way as to avoid any heating of the transistor T and a short circuit of the inductance L, which is saturated at that moment.

The voltage control loop MG_U controls whether the power supply voltage ALG does not exceed a maximum value, in this case Ua+15 volts in the example taken, thereby preventing any sudden shock to the grids of the transistors in the power circuit C_MOS.

In a second step (2), after the power supply system BOOST has been energized, the driver DRIV1 is energized so as to make it active. The latter is then ready to receive orders from the management circuit C_MG.

The energization that corresponds to putting the driver DRIV1 under voltage is performed in the following way:

the comparator COMP1 of the starting means for applying the voltage CMP of the driver CRIV1, shown in FIG. 4, is permanently comparing the power supply voltage ALG with a first reference voltage REF1. According to the result of that comparison, the current source C_S1 of the driver DRIV1 is unblocked by means of an unblocking signal FO which is transmitted by the comparator COMP1 to the current source C_S1 as is indicated in FIG. 4.

Thus, if the power supply voltage ALG is lower than the first reference voltage REF1, the current source C_S1 is open.

In the opposite case, if it is greater than or equal to the reference voltage REF1, the current source C_S1 is closed at the battery potential Ua. This enables the driver DRIV1 to be primed, and, in particular, it enables the power supply ALIM of the driver DRIV1, and subsequently the internal logic unit LOGIC of the driver DRIV1, which operates generally at 5V, to be energized, and the transistors of the power circuit C_MOS to be powered, so that control of the transistors can then be achieved.

In addition, in a preferred embodiment which is however not limiting, the comparator COMP1 has a hysteresis, of for example 2 volts, so that it is not sensitive to amplitude fluctuations in the power supply potential ALG. This hysteresis enables the comparison which is effected to be stabilised.

Figure 5:
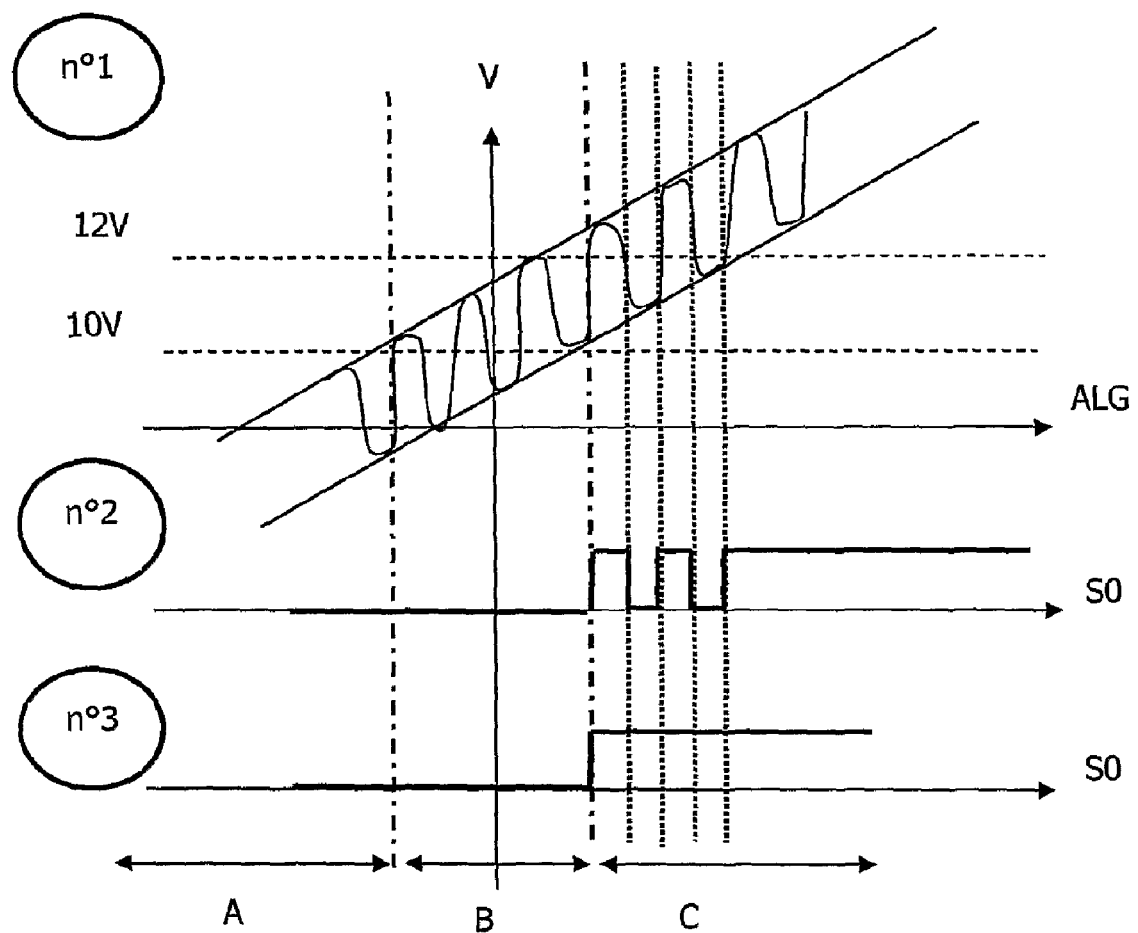
FIG. 5 is a graph showing a hysteresis applied by the means shown in FIG. 4 for initiating energization.

The hysteresis is shown in FIG. 5, and it is applied in the following way: if the power supply voltage ALG is greater than or equal to REF1=Ua+12V, the unblocking signal S0 is positioned at a high level, the current source C_S1 is closed or switched, and the driver DRIV1 is active.

As can be seen in FIG. 5, the power supply voltage ALG is not a pure signal, in that it includes fluctuations. The fluctuations may then give rise to a fluctuation in the unblocking signal S0, and, as a consequence, to some instability in the switching of the current source C_S1, as can be seen in FIG. 5 in the portion C of the latter and graph number 2.

In order to resolve this problem, as soon as the power supply voltage ALG reaches Ua+12V, the hysteresis lowers the first reference voltage REF1 to Ua+10V.

Thus, in spite of the fluctuations in the power supply voltage ALG, the unblocking signal S0 remains stable, as does the switching of the current source ALIM as can be seen in graph number 3. In addition, this avoids any shock being given to the components of the comparator COMP1 through heating. In this connection, without any hysteresis, if the power supply voltage ALG increases slowly, the components work in a linear mode in a range close to the threshold voltage of 12V of the comparator COMP1, thereby giving rise to heating and instability of the unblocking signal S0.

Thus with hysteresis, the following logic is obtained:

If the current source C_S1 is no longer switched, then:
if the power supply voltage ALG is lower than REF1=Ua+12V, the current source C_S1 is open and the driver DRIV is inactive, then the system is in the ranges A and B shown in FIG. 5, whereas
if the power supply voltage ALG is greater than REF1=Ua+12V, the current source C_S1 switches and the driver DRIV is active, so that the system is in the range C shown in FIG. 5.

If the current source C_S1 is switched, then:
if the power supply voltage ALG remains greater than REF1=Ua+10V, the current source C_S1 remains switched, the driver DRIV remains active, and the system is then in the ranges B and C shown in FIG. 5, whereas
if the power supply voltage ALG drops again below REF1=Ua+10V, the current source C_S1 opens and the driver DRIV becomes inactive once more, so that the system is once again in the range A shown in FIG. 5.

Thus in the range Ua+10V and Ua+12V, the driver DRIV is primed or not primed according to the previous state of switching of the current source C_S1.

Figure 6:
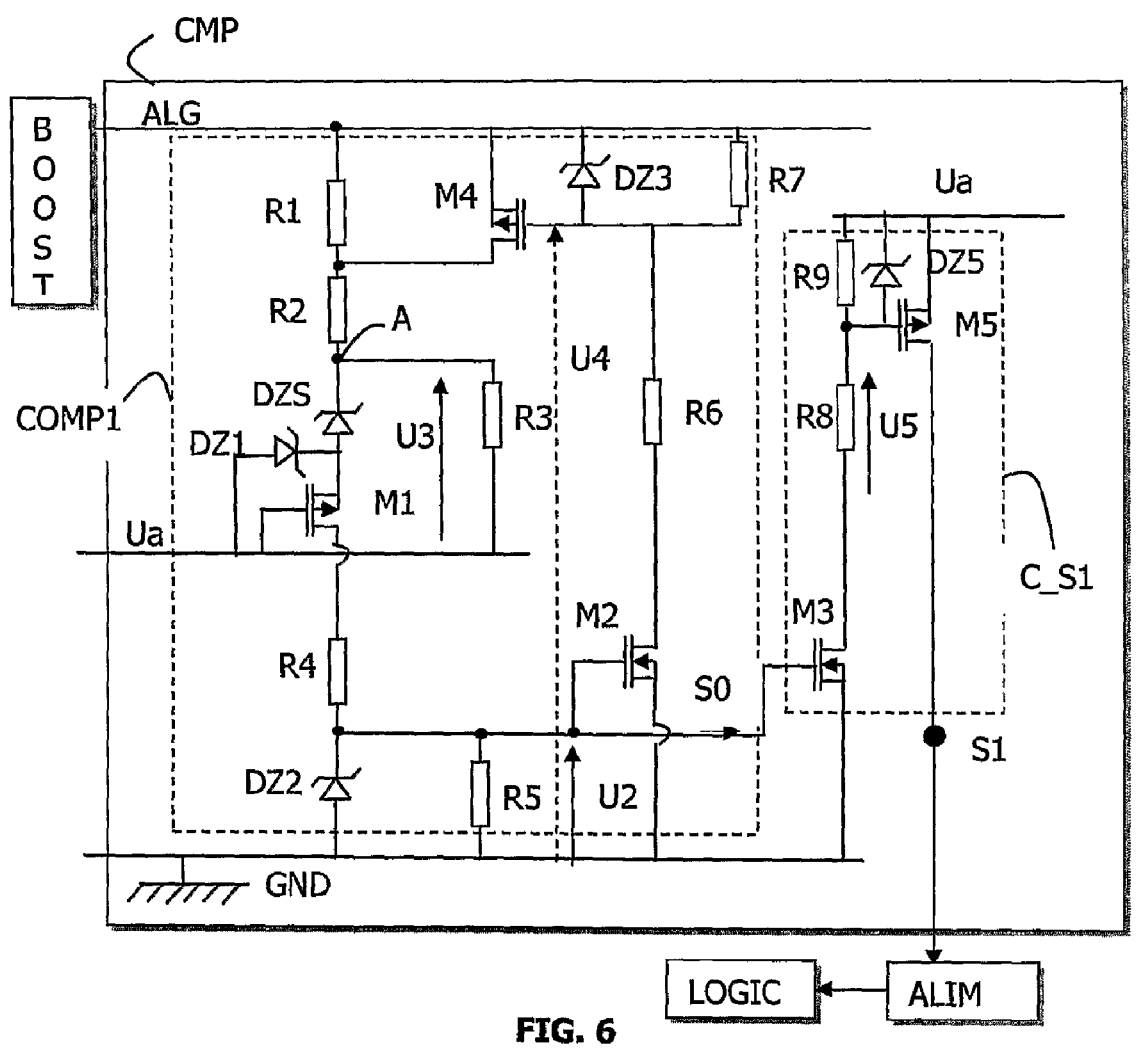
FIG. 6 is a preferred embodiment of the means of FIG. 4 for initiating energization.

The advantage is that there is no consumption of energy on the part of the driver DRIV1 when it is not primed because such a driver only includes components such as transistors, as will be seen in detail later herein, which do not consume because they are open at that moment FIG. 6 shows a preferred but non-limiting embodiment of the voltage applying means CMP, and in particular of the comparator COMP1 and current source C_S1. The voltage applying means CMP include, in particular, a plurality of power transistors of the MOS type.

The comparator COMP1 comprises the following:
a Zener threshold diode DZS, and
a first transistor M1.

The hysteresis function of the comparator COMP1 is effected by means of the following:
a second transistor M2 and a fourth transistor M4, the second transistor M2 being adapted to close or open the fourth transistor M4, and
a divider bridge consisting of a first resistor R1, a second resistor R2 and a third resistor R3.

The following relationships apply:

$$U3 = \frac{R3}{R1 + R2 + R3} * (ALG - Ua), \qquad [1]$$

where U3 is the voltage across the third resistor R3.
U2 is the grid voltage of the second and third transistors M2 and M3, and
U4 is the grid voltage of the fourth transistor M4.

The current source C_S1 comprises the following:
a third transistor M3 which is arranged to activate the power supplies ALIM to the driver DRIV which are described in the remainder of this description, and
a fifth transistor M5, the function of which is to prevent energy being consumed in the power supplies ALIM of the driver DRIV when the driver has not been energized, U5 being the grid voltage of the fifth transistor M5.

In addition, the comparator COMP1 further includes the following:
a fifth resistor R5 which is a pull-down resistor, and the function of which is to fix the potential of the grids of the second and third transistors M2 and M3 at earth voltage when the first transistor M1 is open,
a seventh resistor R7 which is a pull-up resistor, and the function of which is to fix the potential of the grid of the fourth transistor M4 at the power supply voltage ALG when the second transistor M2 is open, and
a ninth resistor R9, which is a pull-up resistor and the function of which is to fix the potential of the grid of the fifth transistor M5 at battery voltage Ua when the third transistor M3 is open.

It will be noted that the power supply voltage ALG is applied to the fourth transistor M4 and to the first resistor R1 and seventh resistor R7, and the battery voltage Ua is applied preferentially to the fifth transistor M5. The power supply voltage ALG could also be applied to the fifth transistor M5 instead of the battery voltage Ua.

In one preferred, but non-limiting embodiment, the first transistor M1, fourth transistor M4 and fifth transistor M5 are transistors of the PMOS type, while the other transistors are transistors of the NMOS type. The operation of such transistors will not be described because it is well known to the person skilled in this field. It will simply be mentioned that, in order for an NMOS transistor to be closed, it is necessary that its grid voltage is greater than its source voltage, while for a PMOS transistor it is necessary for its grid voltage to be lower than its source voltage.

Preferably, grid protection means are associated with each power transistor of the MOS type, for example a Zener diode DZ the function of which is to protect each transistor M in such a way that its grid-source voltage does not exceed 15V, the optimum working voltage of MOS transistors. This avoids the possibility of a transistor M becoming saturated and therefore burning out in the event that this voltage is exceeded. It will be noted in FIG. 6 that the second Zener diode DZ2 is associated with the second transistor M2 and third transistor M3.

In addition, and preferably, current limiting means are associated with each Zener diode DZ for limiting current when the first transistor M1 becomes highly passing, i.e. in the case where the power supply voltage ALG is higher than Ua+15V. This prevents the diodes from burning out. In one non-limiting embodiment, the current limiting means include a resistor. Thus, a fourth resistor R4 is associated with the second Zener diode DZ2. The resistors associated with the third Zener diode DZ3 and the fifth Zener diode DZ5 are the sixth resistor R6 and eighth resistor R8 respectively. Thus the fourth resistor R4, sixth resistor R6 and eighth resistor R8 have the function of limiting current in the associated Zener diodes DZ2, DZ3 and DZ5 respectively. It will be noted that the second resistor R2 also serves to limit the current in the second Zener diode DZ2.

In one non-limiting example, the values of the components mentioned above are for the voltage divider bridge R1, R2, R3: 2 kΩ, 6 kΩ and 4 kΩ respectively.

for the current limiting means: (R4, R5), (R6, R7), (R8, R9)=(10 kΩ, 50 kΩ).

for the Zener diodes DZ2, DZ3 and DZ5 which are used as protection means: a threshold voltage of 15V.

for the threshold Zener diode DZS: a threshold voltage Vsdzs of preferably 3V.

It will be noted that obviously other values can be used, in particular for the divider bridge, the only constraint being that it must be possible to effect hysteresis of 2V in the example given with voltages of 10 and 12V.

The method of operation of the voltage applying starting means for applying the voltage CMP, in accordance with the embodiment shown in FIG. 6, is described in greater detail below.

In the rest mode, when the current source C_S1 is no longer switched, the power supply voltage ALG is below Ua−Vd=13.5−0.6V=12.9V approximately. It will be noted that, when the battery is flat, its voltage is about 13.5V instead of 14V (when the battery is charged), as was mentioned earlier herein.

The first transistor M1 is open because the grid voltage (Ua−Vd) is higher than the source voltage (ALG).

The second and third transistors M2 and M3 are also open because their grid voltage (U2) is equal to their source voltage which is at earth potential.

The fourth transistor M4 is open because its grid voltage is equal to its source voltage=ALG (there is no current I in the seventh resistor R7).

The fifth transistor M5 is also open, because its grid voltage is equal to its source voltage (Ua) (or possibly to the power supply voltage ALG).

Figure 7:
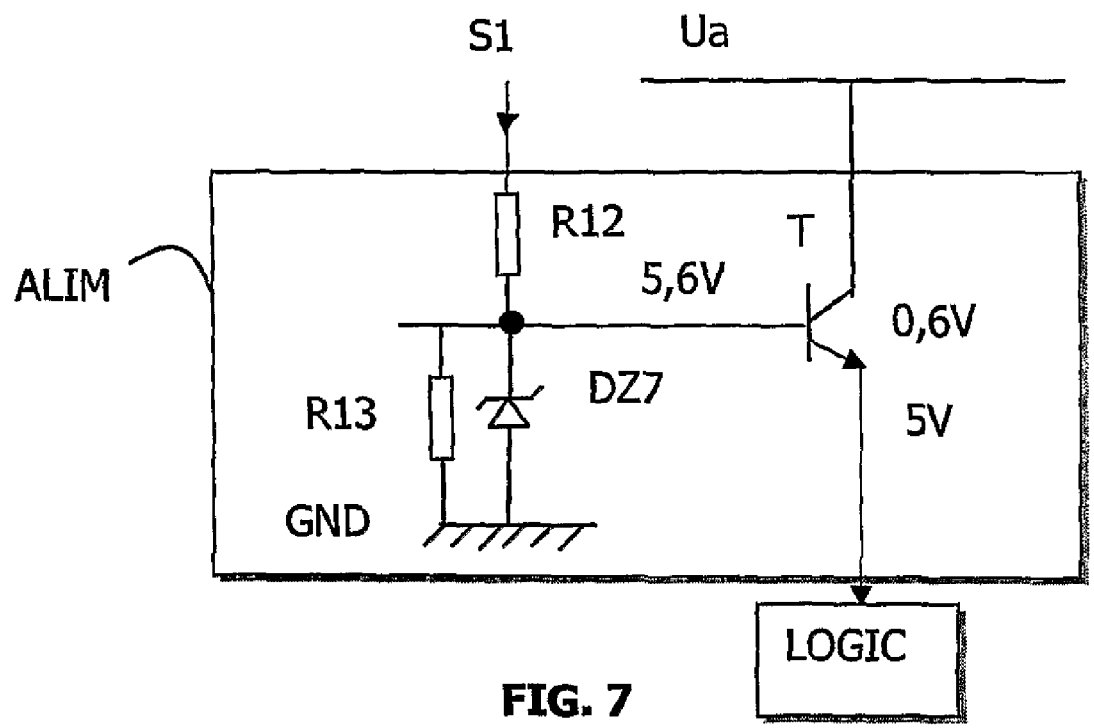
FIG. 7 shows one embodiment of power supplies to a control circuit, which are arranged to be activated by the means shown in FIG. 4 for initiating energization.

The activation signal S1 is then once again at earth potential GND via the power supplies ALIM, and in particular via the twelfth resistor R12 and thirteenth resistor R13 in FIG. 7. The power supply voltage ALG therefore "passes" through the following path: R1-R2-R3.

It will be noted that, since all of the transistors M are open, there is no energy consumption, by contrast with a system of comparators containing operational amplifiers, or comparators that necessitate permanent energy consumption, for example. Moreover, it will be noted that the starting means that apply the voltage CMP have no need to be of great precision, for example accurate to a hundredth of a volt. Thus it is not necessary to have recourse to operational amplifiers In addition it will be noted that without the existence of the second transistor M2 and sixth resistor R6, the fourth transistor M4 will always be open. In this connection, in that case the grid voltage U4 of the fourth transistor M4 would always be equal to the power supply voltage ALG, and therefore always equal to its source voltage (=ALG). The grid-source voltage would therefore always be equal to 0.

In the operating mode (that is to say with the ignition key turned or in the starting position), the power supply voltage ALG increases, and at that moment the power supply voltage ALG becomes greater than Ua-Vd. As a result, the source voltage of the first transistor M1 becomes higher than its grid voltage, and the first transistor M1 closes. More precisely, the first transistor M1 closes when there exists a difference of about 1V between its grid voltage and its source voltage.

However, the threshold diode DZS is no longer passing because its threshold voltage of 3V has not yet been reached.

It is only when the power supply voltage ALG becomes higher than Ua+12V=13.5V+12V=about 24.9V, that the threshold diode DZS, the threshold voltage Vdszs of which is 3V, becomes passing. In this connection the potential at the point A=U3 becomes greater than 4V (the voltage U3 also increasing in the relationship [1] quoted above). At this moment, the power supply voltage ALG passes through the route R1-R2-DZS-M1.

The fact that the threshold diode DZS is passing causes the grid voltage of the second transistor M2 (U2) and the third transistor M3 (U2) to be increased as compared with their source voltage (which is earth potential). As a result, the transistors M2 and M3 close.

The closing of the second transistor M2 and third transistor M3 causes that of the fourth transistor M4 and fifth transistor M5 respectively to take place.

In this connection, as regards the fourth transistor M4, when the second transistor M2 closes, current I passes through the seventh resistor R7 so that the voltage at its terminals $U_{R7} \geq 1V$. At that moment, the grid voltage U4 of the fourth transistor M4 is lower than the source voltage (=ALG). The grid-source voltage is about 1V.

In addition, as regards the fifth transistor M5, when the third transistor M3 closes, current passes through the ninth resistor R9. At that moment the grid voltage U5 across the fifth transistor M5 is lower than its source voltage (=Ua).

Thus, when the fourth transistor M4 closes, the first transistor R1 is short circuited and the ratio of the voltage divider bridge is changed. The following relationship is obtained:

$$U3 = \frac{R3}{R2 + R3} * (ALG - Ua)$$

The bridge only includes the second and third resistors R2 and R3, and its value thus corresponds to no more than 10V. The power supply voltage ALG now passes through the path M4-R2-M1-R4.

A new potential of Ua+10V is then the new potential for rendering the first transistor M1 passing or not passing, and the current source C_S1 open or closed as we have already seen above.

In addition, when the fifth transistor M5 closes, the activation signal S1 is positioned at the battery voltage level Ua (or possibly at the power supply voltage level ALG), and is transmitted to the supplies ALIM of the driver DRIV1. The supplies ALIM enable the battery voltage Ua to be converted into an operating voltage for the logic unit LOGIC of the driver DRIV1 which is in general 5V.

Thus, the power supplies ALIM of the driver DRIV1 are activated and consequently the logic unit LOGIC of the driver is energized, while the power circuit C_MOS is started, and control of the transistors can therefore be effected.

In a non-limiting embodiment shown in FIG. 7, the power supplies ALIM comprise the following:

a twelfth resistor R12, of 3 kΩ for example, which is connected to the fifth transistor M5 so as to reduce the battery voltage Ua to a voltage of 5.6V, a seventh Zener diode DZ7, with a threshold voltage of 5.6V, connected to earth and to the twelfth resistor R12, a transistor T with a junction voltage of 0.6V, which is connected, at the battery potential Ua, to the logic unit of the driver DRIV1, and which is situated between the twelfth resistor R12 and the seventh Zener diode DZ7, and a thirteenth resistor R13, the function of which is to connect to earth the transistor T when the fifth transistor M5 of the current source C_S1 is open.

Thus, in accordance with the invention which was set forth earlier herein, a unique connecting means or power supply input means L_ALG are used to apply a voltage to the drivers DRIV and to transmit a potential which passes between the management circuit C_MG and the drivers DRIV, in this case the potential that enables the grids of the MOS power transistors to be charged. As a result of this, not more than two connecting wires are used to transmit a voltage applying signal and a potential respectively. In this way space is made available within the control and power device MCP. In consequence, the latter can be integrated more easily in the casing of the alternator-starter.

However, it can happen that this power supply input L_ALG is defective. In order to detect a breakage, i.e. a loss of connection, on the input L_ALG, in one preferred but non-limiting embodiment the starting means for applying the voltage CMB further include means COMP2, illustrated in FIG. 4, for detecting breakage of the connection. These means COMP2 accordingly detect whether the input L_ALG is in proper working order. If it is not in proper working order, this can for example give rise to malfunctioning in the associated branch B of the power circuit C_MOS, the transistors of the branch remaining open.

Figure 8:
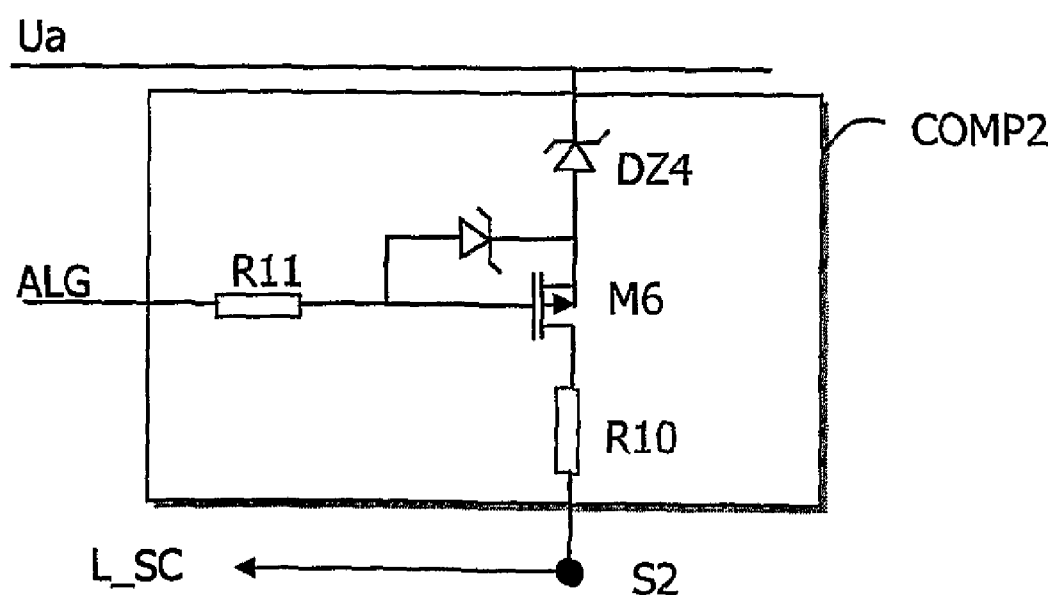
FIG. 8 is a preferred embodiment of the means shown in FIG. 4 for detecting breakage of a connection.

FIG. 8 shows a preferred but non-limiting embodiment of the breakage detecting means COMP2.

The means COMP2 comprise the following:
a sixth power transistor M6,
a tenth resistor R10 and eleventh resistor R11, and
a fourth Zener diode DZ4.

The function of the eleventh resistor R11 is to limit the current when the power supply voltage ALG is close to zero.

The function of the tenth resistor R10 is to enable the signal S2 that represents the breaking of the connection to be put at a level of, for example, 5V.

The function of the fourth Zener diode DZ4 is to supply a second reference value REF2.

In one non-limiting example, the values of these components are as follows:
for the eleventh resistor R11: 20 kΩ.
for the tenth resistor R10: 10 kΩ.
for the fourth Zener diode DZ4: a threshold value of 5V The breakage detecting means COMP2 operate in the following way:

The breakage detecting means COMP2 compare the power supply voltage ALG situated on the power supply input L_ALG with a second reference voltage REF2. Depending on the result of that comparison, the breakage detecting means COMP2 transmit a signal S2 representing breaking of the signal to the control circuit C_MG.

Preferably, the second reference voltage REF2 is equal to: Ua−Vd−Vm, where Vd is the junction voltage at the terminals of the diode D of the power supply system BOOST, and Vm is a marginal voltage.

The marginal voltage Vm is preferably equal to 2V. The two volts therefore enable a certain test margin to be obtained with respect to normal operation of the power supply input L_ALG, normal operation being when the power supply voltage ALG is equal to or greater than Ua−Vd.

Thus, if the connection L_ALG is not defective, the power supply voltage ALG across the connecting means L_ALG is held at a voltage which is equal to Ua−Vd, and the sixth transistor M6 stays open. There is no consumption by the break detecting means COMP2.

On the other hand, if the connection L_ALG is defective, i.e. if the power supply voltage ALG is lower than the second reference voltage REF2, then the sixth transistor M6 closes. At that moment, the rupture signal ST is passed to the generating circuit C_MG through the sensor input L_SC.

It will be noted that in general, when the connection L_ALG is defective, the power supply potential ALG falls rapidly to earth potential. In addition, the transitory period that exists between the voltages Ua−Vd and Ua−Vd−Vm only lasts a few milliseconds.

The management circuit C_MG then applies a strategy following this failure of the connection. This strategy can for example consist in disabling some energy consuming equipment on the vehicle, such as the air conditioning or audio systems, so as to consume less energy, or it may prohibit starting of the vehicle.

The breakage detection means COMP2 are activated according to the following plan:

When the vehicle is stationary, once the management circuit C_MG is active and before starting takes place, the management circuit includes a step of activating the breakage detecting means COMP2 and testing the signal passing through the sensor input L/SC.

It will be noted that when the vehicle is stopped, the signal passing through the sensor input L_SC is always at zero. Thus, if the signal is equal to 0, there is no fault in the power supply input L_ALG. On the other hand, if the signal is equal to 5V, this corresponds to the break signal S2, and the presence of a fault on the power supply input L_ALG can be deduced.

In the same way, in the alternator mode, the management circuit C_MG is active, and it performs a step of activating the breakage detecting means COMP2 and of testing the signal passing through the sensor input L_SC.

It will be noted that in the alternator mode, the signal passing through the sensor input L_SC is also normally always at zero.

It will also be noted that in the alternator mode, in the case of a loss of connection, the power supply voltage ALG is at earth potential, and the drivers DRIV stop working, the transistors of the drivers having their grid-source in short circuit. However, the transistors of the drivers DRIV include parasitic diodes which carry out synchronous rectification. The alternator starter thus works as usual though in a reduced mode. The management circuit C_MG can thus apply a strategy such as to reduce energy consumption.

In a fourth step (4), after a voltage has been applied to the driver 1, the driver DRIV1 verifies what mode the alternator starter is in, in accordance with the validation signals VA and VD.

For example, when the alternator mode is selected, the validation input L_VA receives a logic signal at 1, and the validation input L_VD receives a signal at 0, and vice versa where the starter mode is selected. The logic level 1 is for example a voltage of 5 volts, and the logic level 0 a zero voltage.

When the alternator starter is in the starter mode, the driver receives the sensor signals SC coming from the position sensors of the rotor. The grids of the transistors 11 and 12 are controlled as a function of the signals received on the sensor input L_SC.

When the alternator starter is in its alternator mode, the power transistors 11 and 12 work in synchronous rectification, that is to say comparators (not shown) detect the phase level PH on the phase input MPH, with respect to earth potential GND on the input MGND and with respect to the output potential Ua on the input Mua. The result of this comparison is applied to the grids of the transistors 11 and 12.

Control of the transistors of the power unit C-MOS will not be described in detail because it forms part of the general knowledge of the person skilled in this technical field.

Thus, in the starter mode, the breakage detecting means COMP2 are inactive because the input/output L_SC is taken to actuate the MOS transistors via the drivers DRIV. On the other hand, if there is a fault (rupture of the connection L_ALG), the MOS transistors remain open and the vehicle does not start.

In the alternator mode, the input/output L_SC is released, and detection of the fault is able to operate. This detection enables the system not to remain in its diode rectification mode, as described earlier herein, which causes severe heating of the MOS transistors. Detection by the detecting means COMP2 enables the fault signal (as to rupture of the connection L_ALG) to be transmitted immediately, and enables the control circuit C_MG to perform the shutting-down strategy in accordance with the general architecture of the vehicle and in the manner described above.

While the process and product herein described constitute preferred embodiments of this invention, it is to be understood that the invention is not limited to this precise process and product, and that changes may be made therein without departing from the scope of the invention which is defined in the appended claims.

What is claimed is:

1. A control and power device for a rotary electrical machine, said control and power device comprising:
    a management circuit and a power circuit, said power circuit comprising:
    a plurality of power transistors and control circuits associated with said plurality of power transistors;
    connecting means between said management circuit and said control circuits;
    said connecting means being adapted to apply a voltage to said control circuits and to transmit at least one potential passing between said management circuit and said control circuits;
    wherein a control circuit further includes means for detecting breakage of said connecting means.

2. The control and power device according to claim 1, wherein said at least one potential is a power supply voltage for supplying said power transistors.

3. The control and power device according to claim 2, wherein a control circuit includes means adapted to initiate the application of said voltage.

4. The control and power device according to claim 3, wherein said means for initiating the application of voltage are adapted to effect initiation as a function of said potential.

5. The control and power device according to claim 3, wherein said means for initiating the application of voltage include a comparator designed to compare said at least one potential with respect to a first reference voltage.

6. The control and power device according to claim 5, wherein said comparator includes hysteresis for determining said first reference voltage.

7. The control and power device according to claim 5, wherein said comparator is adapted to transmit an unblocking signal according to a result of said comparison with said first reference voltage in such a way as to prime said control circuit.

8. The control and power device according to claim 7, wherein the means for initiating the application of voltage further include a current source which is adapted to receive said unblocking signal and to transmit an activation signal to said control circuit whereby to prime it.

9. The control and power device according to claim 1, wherein said detecting means is adapted to transmit a signal as to breakage of the connection to said management circuit.

10. A control and powering method for the control and powering of a rotary electrical machine comprising a management circuit and a power circuit, said power circuit including a plurality of power transistors and control circuits associated with said power transistors, wherein it includes the steps of:
    applying a voltage to said power circuits;
    transmitting at least one potential passing between said management circuit and said control circuits, the transmission and the application of voltage being effected by means of a unique connecting means between said management circuit and said control circuits; and
    detecting breakage of the connection of connecting means.

11. The control and powering method according to claim 10, wherein said at least one potential is a power supply voltage adapted to supply power to said power transistors.

12. The control and powering method according to claim 10, wherein it further includes a supplementary step of initiating the application of voltage to said control circuits.

13. The control and powering method according to claim 12, wherein the initiation is a function of said potential.

14. The control and powering method according to claim 12, wherein said step of initiating application of voltage includes a sub-step in accordance with which said at least one potential is compared with a first reference voltage.

15. The control and powering method according to claim 14, wherein said first reference voltage is determined in accordance with a hysteresis.

16. The control and powering method according to claim 14, wherein in accordance with the result of said comparison with said first reference voltage, an activation signal is transmitted to said control circuit whereby to prime it.

17. The control and powering method according to claim 10, wherein said detecting step includes a sub-step of transmitting a signal as to breakage of the connection to said management circuit.

18. A control and power device for a rotary electrical machine comprising:
    a management circuit and a power circuit, said power circuit comprising a plurality of power transistors; and
    control circuits associated with said plurality of power transistors; said power circuit further comprising at least one connector between said management circuit and said control circuits for applying a voltage to said control circuits and to transmit at least one potential passing between the said management circuit and the said control circuits;
    said at least one connector being adapted to apply a voltage to said control circuits and to transmit at least one potential passing between said management circuit and said control circuits;

wherein said control circuit further includes a detector for detecting breakage of said connection circuit.

19. The control and power device according to claim 18, wherein said at least one potential is a power supply voltage for supplying said power transistors.

20. The control and power device according to claim 18, wherein a control circuit includes an initiator adapted to initiate the application of said voltage.

21. The control and power device according to claim 20, wherein said initiator for initiating the application of voltage is adapted to effect initiation as a function of said potential.

22. The control and power device according to claim 20, wherein said initiator for initiating the application of voltage includes a comparator designed to compare said at least one potential with respect to a first reference voltage.

23. The control and power device according to claim 22, wherein said comparator includes hysteresis for determining said first reference voltage.

24. The control and power device according to claim 22, wherein said comparator is adapted to transmit an unblocking signal according to a result of said comparison with said first reference voltage, in such a way as to prime said control circuit.

25. The control and power device according to claim 20, wherein said initiator for initiating the application of voltage further includes a current source which is adapted to receive said unblocking signal and to transmit an activation signal to said control circuit to prime it.

* * * * *

UNITED STATES PATENT AND TRADEMARK OFFICE
CERTIFICATE OF CORRECTION

PATENT NO.        : 8,129,929 B2
APPLICATION NO.   : 11/571778
DATED             : March 6, 2012
INVENTOR(S)       : Jean-Marie Pierret and Francis Pichon Page 1 of 1

It is certified that error appears in the above-identified patent and that said Letters Patent is hereby corrected as shown below:

In Column 1, Line 25, after alternator, please insert -- . --.

In Column 6, Line 26, after fluctuations, please insert -- . --.

In Column 6, Line 37, please delete "1 A" and insert -- 1A -- therefor.

In Column 6, Line 53, please delete "CRIV1" and insert -- DRIV1 -- therefor.

In Column 7, Line 8, please delete "stabilised" and insert -- stabilized -- therefor.

In Column 7, Line 59, after moment, please insert -- . --.

In Column 9, Line 63, after amplifiers, please insert -- . --.

In Column 10, Line 41, after first, please delete "transistor" and insert -- resistor -- therefor.

Signed and Sealed this
Sixteenth Day of October, 2012

David J. Kappos
*Director of the United States Patent and Trademark Office*